United States Patent
Nelson

(10) Patent No.: US 9,481,245 B2
(45) Date of Patent: Nov. 1, 2016

(54) VEHICLE SOBRIETY INTERLOCK SYSTEMS AND METHODS WITH VEHICLE WARM-UP SUPPORT

(71) Applicant: 1A Smart Start, Inc., Grapevine, TX (US)

(72) Inventor: Aaron Theodore Nelson, Asheville, NC (US)

(73) Assignee: 1A Smart Start LLC, Grapevine, TX (US)

( * ) Notice: Subject to any disclaimer, the term of this patent is extended or adjusted under 35 U.S.C. 154(b) by 8 days.

(21) Appl. No.: 14/638,680

(22) Filed: Mar. 4, 2015

(65) Prior Publication Data
US 2015/0251660 A1    Sep. 10, 2015

Related U.S. Application Data

(60) Provisional application No. 61/950,579, filed on Mar. 10, 2014.

(51) Int. Cl.
*G08B 23/00* (2006.01)
*B60K 28/06* (2006.01)
*B60W 40/08* (2012.01)

(52) U.S. Cl.
CPC ..... *B60K 28/063* (2013.01); *B60W 2040/0836* (2013.01)

(58) Field of Classification Search
CPC .... B60K 28/02; B60K 28/06; B60K 28/063; B60W 2540/24; B60W 2040/0836; G01N 33/497; G01N 33/4972

USPC .......................................... 340/576; 180/272
See application file for complete search history.

(56) References Cited

U.S. PATENT DOCUMENTS

| | | | | | |
|---|---|---|---|---|---|
| 3,942,151 | A | * | 3/1976 | Takeuchi | B60K 28/063 340/576 |
| 4,645,939 | A | * | 2/1987 | Robinson | B60R 25/04 340/576 |
| 5,392,030 | A | * | 2/1995 | Adams | G08B 21/06 340/576 |
| 2007/0144812 | A1 | * | 6/2007 | Stewart | B60K 28/063 340/576 |
| 2009/0293589 | A1 | * | 12/2009 | Freund | G07C 5/0891 348/143 |
| 2013/0277134 | A1 | * | 10/2013 | Morley | A61B 5/18 180/272 |

* cited by examiner

*Primary Examiner* — Thomas Mullen
(74) *Attorney, Agent, or Firm* — Thompson & Knight LLP; James J. Murphy

(57) ABSTRACT

A vehicle sobriety interlock system including a sobriety testing apparatus for testing a driver of a vehicle for intoxication and an interlock system responsive to test results from the sobriety testing apparatus for controlling ignition of an engine of the vehicle. The interlock system, in response to a test result indicating that the driver is sober, allows the driver to start the engine of the vehicle. During a vehicle warm-up time period of a predetermined length following start of the engine and before a transmission of the vehicle has been engaged for putting the vehicle in motion, the interlock system delays a retest of the driver with the sobriety testing system for intoxication.

20 Claims, 4 Drawing Sheets

VEHICLE SOBRIETY INTERLOCK SYSTEMS AND METHODS WITH VEHICLE WARM-UP SUPPORT

CROSS-REFERENCE TO RELATED APPLICATION

The present application claims the benefit of U.S. Provisional Application Ser. No. 61/950,579, filed Mar. 10, 2014, which is incorporated herein by reference for all purposes.

FIELD OF INVENTION

The present invention relates in general to sobriety testing techniques, and in particular to vehicle sobriety interlock systems with vehicle warm-up support.

BACKGROUND OF INVENTION

Sobriety testing, which includes testing for both alcohol and illegal drugs, has taken a prominent role in ensuring a safe and efficient society. For example, ignition interlocks on vehicles have proven their worth in preventing intoxicated drivers from entering the roadways and causing serious, including fatal, accidents. Sobriety testing has also allowed authorities, such as courts and law enforcement agencies, to monitor compliance with the court-ordered restrictions imposed on persons having committed alcohol or drug related offenses. Among other things, with the availability of reliable sobriety testing systems, such offenders can continue travel to work, school, or rehabilitation and thus contribute to society, rather than be a burden.

In cold or hot weather, the test subject (driver) must first take and pass the sobriety test before the engine can be started and the passenger compartment heater or air conditioning activated. In cold or very cold weather, warm-up of the passenger compartment can take several minutes after engine start before the air temperature has increased to a comfortable level for the driver and any accompanying passengers. Similarly, in hot or very hot weather, cooling of the passenger compartment to a comfortable level can take up to several minutes, depending on the vehicle. For the purposes of this application, it is understood that a warm-up process refers to both warming up and cooling down of the vehicle to reach a desired cabin temperature range.

In contrast to vehicles without sobriety interlock systems, the driver of a vehicle equipped with such a system typically cannot start-up the vehicle engine (either directly with ignition switch or with a remote starter system) and then wait in a more comfortable environment while the passenger compartment is warmed or cooled by the vehicle environmental control systems. More specifically, most sobriety testing systems require a retest at some random time within a specified period of time after initial start-up (e.g., 10 minutes) to minimize the chance of an intoxicated driver circumventing the test system. Consequently, at least the driver must remain in the vehicle awaiting the retest, even if the passenger compartment air has not reached a comfortable temperature. This problem is compounded when the driver must care for children or other passengers who must accompany the driver and therefore must also endure the passenger compartment environment prevailing immediately after engine start-up.

SUMMARY OF INVENTION

According to one representative embodiment of the principles of the present invention, a vehicle sobriety interlock system is disclosed, which includes a sobriety testing apparatus for testing a driver of a vehicle for intoxication and an interlock system responsive to test results from the sobriety testing apparatus for controlling operation of the vehicle. The interlock system, in response to a test result indicating that the driver is sober, allows the driver to start the engine of the vehicle. During a vehicle warm-up period of a predetermined length of time following start of the engine, retest of the driver with the sobriety testing system is delayed as long as the vehicle remains in a static condition (e.g., has not been put in a condition for motion, such as when the transmission is taken out of park or engaged into drive or reverse).

Advantageously, a driver who successfully passes the sobriety test is allowed to start the vehicle and allow the environmental control systems to bring the passenger compartment to a predetermined temperature, allowing the driver to retreat to a more comfortable environment during the process. In the preferred embodiment, this "warm-up" period is limited in duration and terminates after expiration of a predetermined time, at which time the typical retest protocol is invoked. Moreover, the retest protocol is immediately invoked if the driver engages the transmission in preparation to drive or if the vehicle motion is detected.

BRIEF DESCRIPTION OF DRAWINGS

For a more complete understanding of the present invention, and the advantages thereof, reference is now made to the following description taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts. For discussion purposes, these principles will be described in conjunction with an alcohol breath testing system operating within an vehicle ignition interlock system. It should be recognized, however, that the systems and methods described below are equally applicable to other types of sobriety testing systems, including sobriety testing systems designed to test for other types of intoxicants and controlled substances (e.g., marijuana).

Figure 1A:
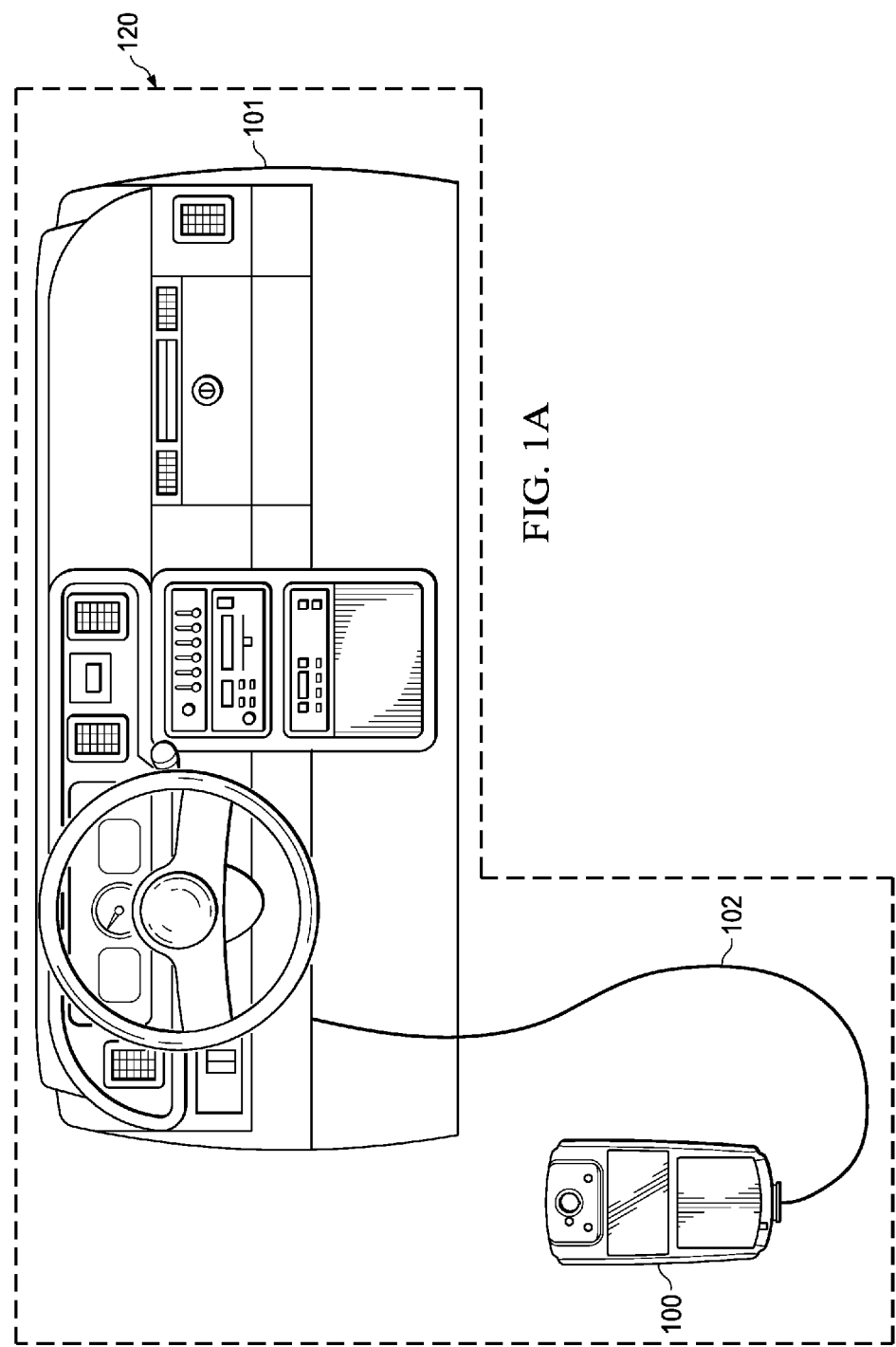
FIG. 1A is a diagram of a portion of an interior of a vehicle including a sobriety interlock system suitable for demonstrating one possible application of the principles of the present invention.

FIG. 1A is a diagram showing a portion of the interior of a motor vehicle 120 in the area of the dashboard. A handheld breath alcohol testing unit 100 is connected to electronic circuitry behind vehicle dashboard 101 (see FIG. 1B) through a cable 102. Generally, a person attempting to start vehicle 120 must provide a breath sample to handheld unit 100, which tests for deep-lung breath alcohol content, deep-lung alcohol content being directly proportional to blood alcohol concentration and thus intoxication level. If the person being tested passes the breath alcohol test, the interlock system allows the vehicle to start. On a test failure, the interlock system disables the vehicle ignition system and the vehicle is rendered inoperable.

Figure 1B:
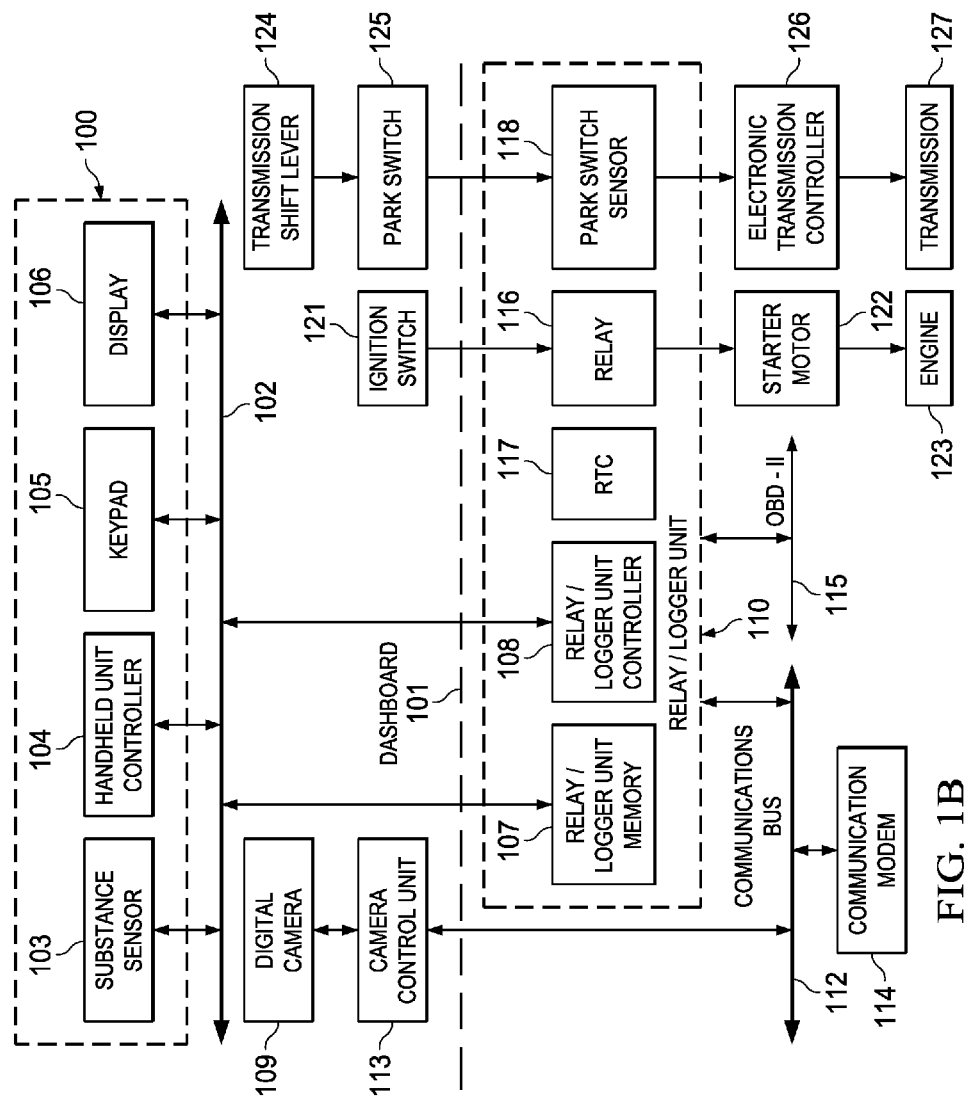
FIG. 1B is a high level functional block diagram of the exemplary sobriety interlock system utilized in the application shown in FIG. 1A.

FIG. 1B is a high level functional block diagram of the overall interlock system. Handheld unit 100, which is discussed in detail below, includes a substance sensor 103, which in the illustrated embodiment is a fuel cell alcohol sensor, a handheld unit controller 104, a keypad 105 for data entry, and a display 106.

Handheld unit 100 electrically communicates through cable 102 with electronics behind dashboard 101. The electronics behind dashboard 101 include relay/logger unit 110 with its memory 107 and relay/logger unit controller 108. Relay/logger unit memory 107, which is preferably solid state memory, such as Rash memory, stores the results of tests performed by handheld unit 100 for periodic retrieval and review by authorities monitoring the driver for compliance with any conditions or restrictions imposed on the driver. In addition, relay/logger unit memory stores the firmware controlling the operation of relay/logger unit controller 108.

Relay/logger unit controller 108, operating in conjunction with handheld unit 100, controls the operation of the vehicle in response to the outcome of a given test. As known in the art, the ignition system of a vehicle can be controlled in any one of a number of ways, including enabling or disabling relays providing power to the starter motor 122 or sending enable or disable commands to one or more on-board computers. In the illustrated embodiment, relay/logger unit controller 108 controls a relay 116, which in turn controls the flow of electrical current between the vehicle ignition switch 121 and starter motor 122. It can also monitor the state of the vehicle park switch 125, which detects the position of transmission shift lever 124, via its park switch sensor 118. Park switch sensor 118 could be a physical sensor, or software/firmware running on the Relay/Logger Unit Controller 108 that monitors the data from the diagnostic communications bus 115, e.g. via the OBD-II connection. Relay/logger unit controller 108 may also be used to generate visible or audible warnings in the event of a failed test, for example, causing the horn to sound or the headlights to flash.

A digital camera 109 or similar imaging device is also preferably provided to allow for positive identification of the person taking the breath test through handheld unit 100. The images taken by digital camera 109 are preferably stored in relay/logger unit memory 107 and/or the memory associated with the Camera Control Unit 113 for retrieval and review by the monitoring authorities. Advantageously, digital camera 109 reduces the possibility of a restricted or intoxicated driver of circumventing the interlock system by having a substitute person providing the breath sample to handheld unit 100. In the illustrated embodiment, digital camera 109 operates in conjunction with a camera control unit 113, which communicates with relay/logger unit controller 108 via an RS-485 standard bus 112.

Also operating off of RS-485 bus 112 is a cellular telecommunications modem 114, which allows relay/logger unit controller 108 to wirelessly send alerts to the authorities in the event of a failed test (i.e., the detection of a controlled substance) or transmit logged information within relay/logger unit memory 107 to the monitoring authorities, whether or not an intoxicated driver has been detected.

In one particular embodiment, handheld unit 100, relay/logger unit memory 107 and relay/logger unit controller 108 communicate, either in whole or in part, with the OBD-II diagnostic system 115 standard on most motor vehicles. The OBD-II system provides another efficient mechanism by which monitoring authorities can access the data stored within relay/logger unit memory 107 through a standard OBD-II port and associated test equipment. In addition, the OBD-II system also allows for vehicle operating data to be recorded and stored within relay/logger unit memory 107 for correlation with the results of sobriety testing performed through handheld unit 100.

OBD-II diagnostic system 115 also provides a communications path for transmission of command and control signals from relay/logger unit controller 108 to various electronics and electrical systems within the vehicle. These command and control signals can be used by interlock system controller 104 and or relay/logger unit controller 108 to disable the vehicle in response to a failed intoxication test.

In the illustrated embodiment, relay/logger unit controller 108 includes a microprocessor or microcontroller, such as a Renesas R5F3650NDFB or similar device. A real time clock (RTC) 117, such as a Seiko S-35390A, operating in conjunction with relay/logger unit controller 108, tracks the date and time.

Figure 2:
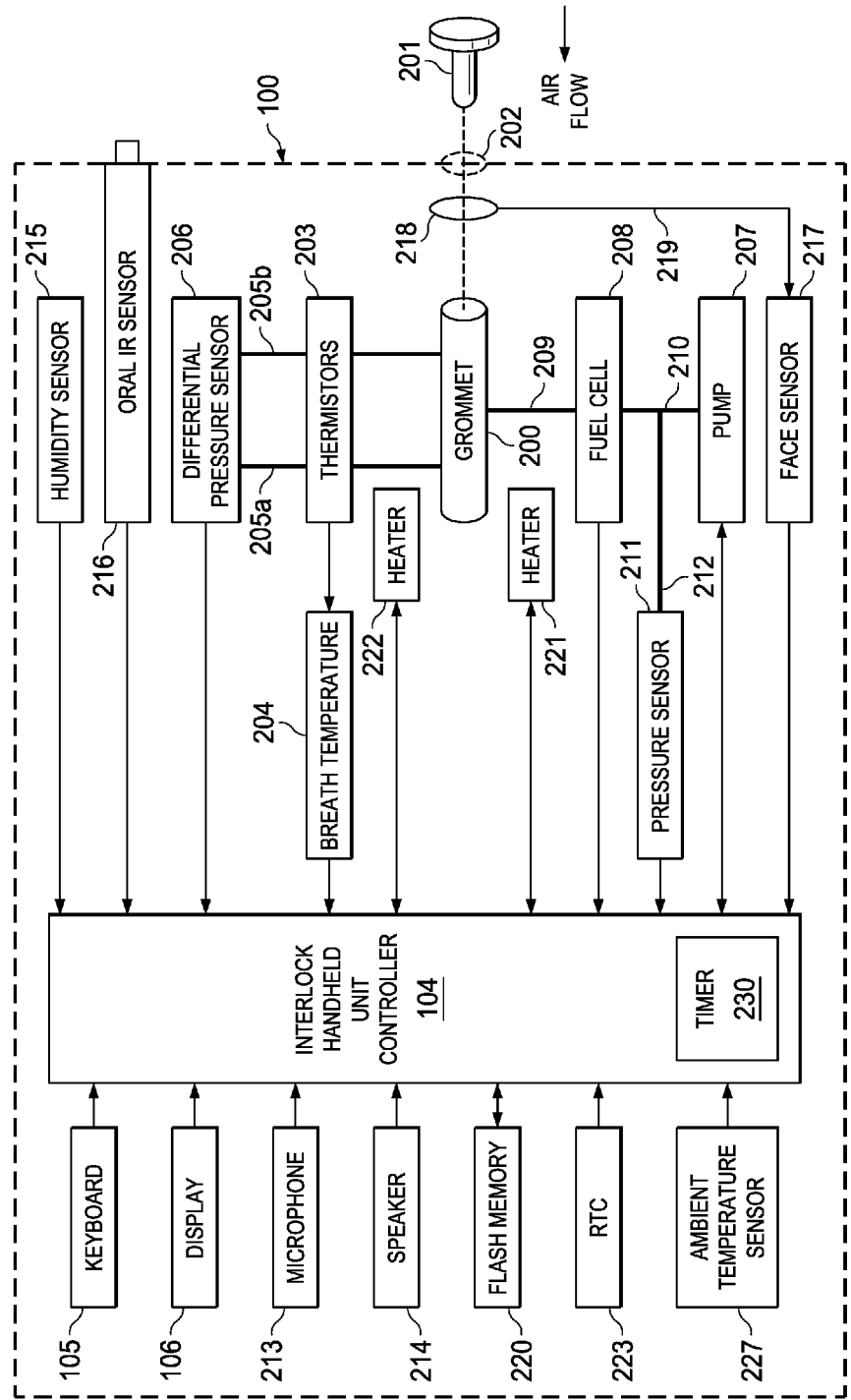
FIG. 2 is a more detailed functional block diagram showing the primary subsystems of the handheld unit shown in FIG. 1B.

FIG. 2 is a more detailed functional block diagram of the primary subsystems within handheld unit 100 in a preferred embodiment of the principles of the present invention. In this embodiment, interlock system controller 104 is a Renesas R5F3650NDFB processor operating in conjunction with firmware stored in Flash memory 220. Interlock handheld unit controller 104 is also supported by a real time clock (RTC) 223. For clarity, interface devices, such as the analog to digital converters (ADCs) interfacing the various blocks with controller 104, and auxiliary subsystems, are not shown in FIG. 2.

A cylindrical grommet 200 receives a disposable mouthpiece 201 through an aperture 202 through the front panel of the case of handheld unit 100. Air introduced by a user (i.e., the human test subject) through mouthpiece 201 generally passes through cylindrical grommet 200 and passes out an aperture through the handheld unit rear panel.

As air flow passes through grommet 200, a set of at least one thermistor 203 and associated breath temperature measurement circuitry 204 measure breath temperature. Breath temperature is one parameter useful for detecting attempts to circumvent an alcohol breath test.

A pair of tubes 205a-205b tap the airflow through grommet 200 to a differential pressure sensor 206, which measures breath pressure and breath air flow rate. As known in the art, in order for an alcohol breath test to be valid, the user must provide sufficient air pressure for a sufficiently long period of time to ensure that a deep-lung air sample is received by the alcohol sensor. If neither of these two conditions is met, interlock system controller 104 aborts the test and the breath test functional routine is reset. One device suitable for use as differential pressure sensor 206 in the embodiment of FIG. 2 is a Sensormatic 35AL-L50D-3210 differential pressure transducer.

Once interlock system controller 104 determines that deep-lung air is being received, a pump 207 is activated to draw a sample of the air flowing through grommet 200 into a fuel cell 208. In the illustrated embodiment, the air sample is drawn through tubes 209 and 210. A pressure sensor 211 monitors the air pressure being provided by pump 207 through a tube 212. One suitable fuel cell 208 is a Dart Sensors LTD 2-MS3 fuel cell operating in conjunction with a pump 207 available from PAS International, although other commercially available fuel cells and pumps may be used in alternative embodiments. A suitable device for pressure sensor 211 is a Sensormatic 33AL-L50D-3210 pressure transducer.

Fuel cell 208 implements a well-known electrochemical process to determine the breath alcohol content of the deep-lung air sample. From the air sample, interlock system controller 104 calculates the corresponding blood alcohol concentration and determines whether the user has passed or failed the test, depending on the legal limits imposed by the given jurisdiction. In response to the test result, interlock system controller 104 sends commands to the vehicle electronics/electrical system and/or relay/logger unit controller 108 to enable or disable the vehicle ignition system. The results of the test are also recorded within relay/logger unit memory 107 for access by the monitoring authorities.

The user interacts with system controller 104 through keypad 105 and display 106, which allow the user to receive prompts and initiate a test in anticipation of starting the vehicle. Keypad 105 is, for example, a physical set of at least one push down key, a set of soft-keys on the device's touchscreen interface, or equivalent. In addition, interlock system controller 104 may periodically require retest of the user to ensure driver sobriety after initial start of the vehicle. In alternate embodiments, a microphone 213 and speaker 214 allow for control of handheld unit 100 by voice command.

In the illustrated embodiment of handheld unit 100, multiple sensors are provided for preventing circumvention of the breath test. In addition to breath temperature circuitry 204, handheld unit 100 also includes a humidity sensor 215, an oral infrared (IR) sensor 216, and a face proximity sensor 217. In the embodiment shown in FIG. 2, face proximity sensor 217 operates in conjunction with an electrode 218 disposed on the inner surface of the front panel of the case of handheld unit 100 and at least partially surrounding aperture 202. A clip 219 provides an electrical connection between the printed circuit board on which face proximity sensor circuit 217 resides and electrode 218.

Temperature can have a significant effect on the operation of handheld unit 100 at cold or very cold temperatures. Among other things, the speed of the electrochemical reaction within fuel cell 208 typically decreases with decreasing temperature. In addition, fuel cell 208 also is subject to a temperature coefficient, wherein the strength of the generated detection signal decreases with decreasing temperature. In addition, when grommet 200 is cold, condensation from the test subject's breath can adversely impact the test measurement.

In order to ensure proper breath content measurements are taken, grommet 200 is heated by a heater 222, which is, for example, one or more metallic sheets disposed around the grommet outer periphery. Similarly, a heater 221 maintains the temperature of fuel cell 208. Heater 221 may be, for example, a metallic sheet disposed against one or more of the outer surfaces of fuel cell 208 or a metal block on which fuel cell 208 sits. In embodiments of handheld unit 100 using a Renesas R5F3650NDFB microcomputer, heaters 221 and 222 are driven with pulse width modulated (PWM) signals that can be made available at certain controller input/output pins by firmware programming. In addition, the temperature of fuel cell heater 221 and grommet heater 222 are monitored and corresponding signals returned to handheld unit controller 104.

According to the principles of the present invention, a driver who successfully passes a sobriety test is permitted to start the vehicle and then leave the vehicle for up to a predetermined amount of time, during which the vehicle environmental control systems can bring the temperature within the passenger compartment to a comfortable level (i.e., the vehicle "warm-up" period). Generally, so long as the vehicle warm-up period has not expired, the vehicle transmission remains in park and no vehicle movement is detected by any available system motion sensor, sobriety retests are delayed thereby allowing the driver to step away from the vehicle. Exemplary system motion sensors include mufti-axis accelerometers, software that detects vehicle's movement via the diagnostic bus 115, GPS, cell-tower triangulation systems detecting motion based on the data sent and received by the Communications Modem 114, and the like. The detection method and sensors are preferably housed in relay/logger unit 110, camera control unit 113, communications modem 114, a combination of the three, or any other location external to the interlock system that is firmly attached to the vehicle.

Figure 3:
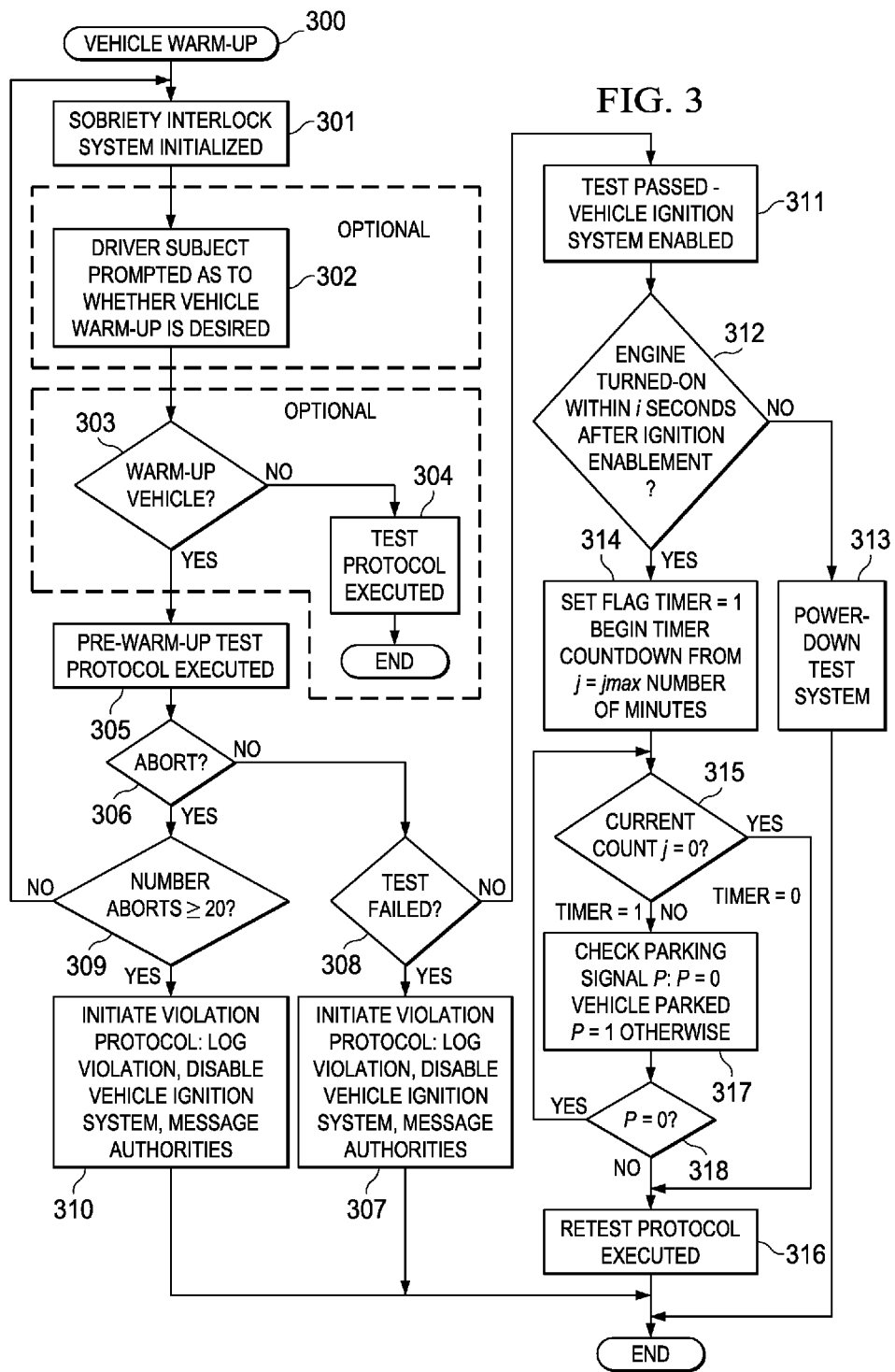
FIG. 3 is a flow chart of a representative vehicle warm-up procedure embodying the principles of the present invention.

FIG. 3 is a flow chart of a vehicle warm-up Procedure 300 according to one embodiment of the principles of the present invention. While, vehicle warm-up Procedure 300 is suitable for use with the sobriety interlock system discussed in detail above in conjunction with FIGS. 1 and 2, it not limited to any particular overall system configuration and may be used with any hardware platform having the appropriate controller and memory needed to execute the corresponding software or firmware. In the representative system of FIGS. 1 and 2, Procedure 300 is preferably implemented using handheld controller unit 104, relay/logger unit controller 108, or a combination of both controllers, operating on firmware programmed into relay/logger unit memory 107, Flash memory 220, memory associated with the camera control Unit 113, or a combination of any of these memories.

At Block 301, the test system is initialized, for example when the driver (i.e., test subject) turns the vehicle ignition switch 121. The driver is then optionally prompted, for example through display 106 or speaker 214 to select whether vehicle warm-up is desired (Block 302). If, at Block 303, the driver responds that vehicle warm-up is not desired, for example using keypad 105 or microphone 213, or if the driver does not respond at all, then the normal testing protocol is executed at Block 304. Under the normal protocol, if the driver takes and passes the breath test, then the vehicle is allowed to start and operate; however, the driver typically will be required to take a retest at some random time within the retest period, which is typically under 15 minutes after the initial test and engine start.

The operations performed at Blocks 302, 303 and 304 are optional; therefore, in one particular embodiment, Procedure 300 moves directly from the operation at Block 301 to the operation at Block 305. The streamlined embodiment advantageously simplifies the operation of the overall system.

On the other hand, if the driver elects to warm-up the vehicle before driving at Block 303, then the pre-warm-up test protocol is executed at Block 305. If the driver aborts a test, at Block 306, then Procedure 300 returns to Block 301 and sobriety interlock system is reset for a new test. In the illustrated embodiment, the driver is allowed up to 20 aborted tests (Block 309) before the violation protocol is initiated (Block 310), although the number of aborted tests may vary in different systems.

Under the pre-warm-up test protocol, the driver must still take and pass a sobriety test before vehicle engine 123 (FIG. 1B) is allowed to start (Block 308). If the driver fails the sobriety test, then the violation protocol is executed at Block 307, wherein the vehicle ignition system is disabled, the violation is logged in relay/logger unit memory 107, and/or a message is sent to the monitoring authorities via communications modem 114.

If the driver successfully passes the test at Block 308, with a number of aborts below the maximum allowable limit at Blocks 306 and 309, the vehicle ignition system is enabled and the vehicle engine 123 can be started for warm-up purposes (Block 311). During the warm-up period, the driver may leave the vehicle while the vehicle environmental control systems warm or cool the passenger compartment. Additionally, accompanying passengers, particularly children, the elderly, or the infirm, can remain in a more comfortable environment until the passenger compartment is ready.

In the warm-up mode, the driver is given a limited amount of time after passing the sobriety test to actually start the vehicle. This time limit minimizes the ability of the driver to circumvent the system. For example, a sober person could take the sobriety test, start the engine, and then pass the vehicle off to an intoxicated person.

In particular, at Block 312, the driver is given i number of seconds after successfully passing the sobriety test to start vehicle engine 123, where i is typically between 20 and 60 seconds, but may vary depending on such factors as the particular system implementation and the type of vehicle. If the driver fails to start the vehicle within the allotted time, then the sobriety interlock system powers-down at Block 313, the vehicle is again disabled from starting, and the driver must reinitiate the sobriety test procedure should the driver still wish to operate the vehicle.

The length of the warm-up period is predetermined based on, for example, the expected time required to warm-up or cool-down the passenger compartment for a given vehicle under given conditions. Therefore, if the driver starts vehicle engine 123 within time period of i number of seconds after successfully passing the sobriety test, then a flag Timer is set to active (i.e., in the illustrated embodiment Timer=1 in the active state) and a master timer 230 (FIG. 2) begins to continuously count down j from maximum vehicle warm-up period of jmax number of minutes (Block 314). (In alternate embodiments, Timer=0 could represent the active state and Timer=1 could represent the inactive state.) The number of minutes, jmax, is preferably selected to provide sufficient time for the vehicle environmental control system to bring the temperature within the vehicle passenger compartment to the desired level, which may vary by vehicle type. In the preferred embodiment, jmax is always less than 45 minutes. Alternatively, the jmax value may be calculated by the interlock system based on the current ambient temperature, as sensed by available ambient temperature sensors, such as the ambient temperature sensor 227 of handheld unit 100, or an equivalent sensor in any part of the Interlock system.

For a typical vehicle with an electronically controlled transmission 127, a signal p is generated, by electronic transmission controller 126, which indicates whether the vehicle is in "park" or if the driver has manually engaged the transmission to take the vehicle out of "park" in order to drive. In the embodiment of Procedure 300 described in FIG. 3, a Logic "0" indicates that the vehicle is in park and a Logic "1" indicates that the vehicle has been taken out of park, although in alternate embodiments the reverse logic may be used with regards to the signal p. In the illustrated embodiment, the logic state of the signal p is detected by the park switch sensor 118 of FIG. 1B, although different techniques may be used in alternate embodiments.

At Block 315, the countdown by the master timer 230 is monitored. Whenever the master timer 230 count reaches j=0, the flag Timer is cleared to Timer=0 and the normal retest protocol is executed at Block 316. As previously indicated, in the normal operating mode, the sobriety test system will randomly test the driver within a predetermined time period after start up to confirm driver sobriety and determine whether or not to allow the vehicle to remain in operation. In the warm-up mode, once the warm-up period has expired, the random sobriety recheck protocol is again invoked, although delayed by the warm-up period of (jmax-j) number of minutes.

During the period before the master timer 230 countdown has reached j=0 (i.e., while the flag Timer continues to be set to 1), the state of the transmission signal p is checked at Block 317 every k number of seconds, where k is preferably within the range of 0.1 to 30 seconds, and nominally 1 second. While the signal p remains in an active state (i.e., p=0) at Block 318 and the vehicle remains in park, the vehicle is allowed to remain in the warm-up mode and Procedure 300 returns to Block 315 and monitoring of the master clock countdown continues.

On the other hand, if p changes to an inactive state (i.e., p=0) at Block 318, indicating that the driver has engaged the transmission in preparation to drive, then Procedure 300 immediately jumps to Block 316 and the random retest protocol is invoked, notwithstanding that Timer continues to be set to 1 and countdown time remains on the master counter.

While Procedure 300 is described for an embodiment in which the vehicle is equipped with an electronic transmission, it can be equally applied to other types of transmissions with minor modifications well within the capabilities of one skilled in the art. For example, in a vehicle that does not include a transmission that generates the equivalent of signal p, a simple electronic circuit can be added, which include a switch for generating an electrical signal when the transmission is taken out of park. For vehicles equipped with a manual transmission an equivalent system may be used that monitors the engagement of the transmission clutch or the clutch pedal.

In sum, the principles of the present invention allow a driver, who successfully passes the initial sobriety test, to start the vehicle and allow the passenger compartment to warm-up or cool-down before the vehicle transmission is engaged and the car set in motion. As a result, the driver and any accompanying passengers can remain outside of the passenger compartment until the environmental controls have brought the passenger compartment temperature to a comfortable level. This is particularly advantageous for drivers with small children or drivers and passengers who are elderly or infirm and have difficulty tolerating low and high temperatures.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A vehicle sobriety interlock system comprising:
   a sobriety testing apparatus for testing a driver of a vehicle for intoxication; and
   an interlock control system responsive to test results from the sobriety testing apparatus for controlling operation of the vehicle, the interlock control system operable to:
   in response to a test result indicating that the driver is not intoxicated, allow the driver to start an engine of the vehicle; and
   during a vehicle warm-up period of a predetermined length of time following starting of the engine, delaying a retest of the driver with the sobriety testing apparatus as long as the vehicle remains in a static state.

2. The vehicle sobriety interlock system of claim 1, wherein the vehicle remains in a static state as long as a transmission of the vehicle is not engaged for putting the vehicle into motion.

3. The vehicle sobriety interlock system of claim 2, wherein the vehicle remains in a static state as long as a transmission of the vehicle remains in a static state.

4. The vehicle sobriety interlock system of claim 3, wherein the interlock control system receives a signal from an electronic transmission controller indicating that the transmission remains in a static state.

5. The vehicle sobriety interlock system of claim 1, wherein the sobriety testing apparatus tests a driver for intoxication from alcohol consumption.

6. The vehicle sobriety interlock system of claim 1, wherein the interlock control system comprises a controller and memory for storing instructions for execution by the controller, wherein the controller and the memory are disposed behind a dashboard of the vehicle.

7. The vehicle sobriety interlock system of claim 1, wherein the interlock control system comprises a controller and memory for storing instructions for execution by the controller, wherein the controller and the memory form a portion of the sobriety testing apparatus.

8. A method of controlling operation of a vehicle comprising:
   receiving a test result signal from a sobriety testing apparatus indicating that a driver of the vehicle is capable of safely operating the vehicle;
   in response to the test result signal, enabling the driver to start the vehicle;
   in response to the driver starting the vehicle, initiating a vehicle warm-up period of a predetermined maximum length of time;
   during the vehicle warm-up period, monitoring a state of a transmission of the vehicle; and
   delaying a sobriety retest of the driver so long as the vehicle warm-up period has not expired and the vehicle is in a static state.

9. The method of claim 8, wherein starting the vehicle warm-up period comprises initiating a timer counting down from a value representing the predetermined maximum length of time.

10. The method of claim 8, wherein monitoring the state of the transmission comprises monitoring an electrical signal generated by a transmission controller indicating that the vehicle is in a static state.

11. The method of claim 8, wherein monitoring the state of the transmission comprises monitoring an electrical signal generated by an electrical switch detecting the position of the transmission shift lever indicating that the vehicle is in a static state.

12. The method of claim 8, further comprising:
   in response to the test result signal, initiating a start-up period of a predetermined maximum length of time; and
   disabling the vehicle from starting when the vehicle has not been started before expiration of the start-up period.

13. The method of claim 8, wherein the predetermined maximum length of time of the vehicle warm-up period is selected to be sufficient to allow a passenger compartment of the vehicle to be heated to a predetermined temperature.

14. The method of claim 8, wherein the predetermined maximum length of time of the vehicle warm-up period is selected to be sufficient to allow a passenger compartment of the vehicle to be cooled to a predetermined temperature.

15. A controller for a sobriety interlock system for a vehicle operable to:
   receive a test result signal from a sobriety testing device indicating that a driver is in condition to safely operate the vehicle;
   in response to receiving the test result signal, initiate a startup time period;
   if the vehicle is started within the startup time period, initiate a warm-up time period;
   during the warm-up time period, monitor a signal generated by the vehicle indicating that the vehicle is in a static state; and
   while the signal generated by the vehicle indicates that the vehicle is in a static state, delay invoking a retesting protocol for retesting the driver with the sobriety testing device.

16. The controller of claim 15, further operable to immediately invoke the retesting protocol when the warm-up period expires.

17. The controller of claim 15, further operable to immediately invoke the retesting protocol when the signal generated by the vehicle indicates that the vehicle has been moved during the warm-up period.

18. The controller of claim 15, further operable to immediately invoke the retesting protocol when the vehicle is detected to be moving during the warm-up period.

19. The controller of claim 15, wherein the controller initiates the startup time period by initiating a counter counting-down from a value representing a maximum length of the startup period.

20. The controller of claim 15, wherein the controller receives the signal indicating that the vehicle is in a static state from an electronic transmission.